Aug. 29, 1944.   W. L. MORRISON   2,356,779
APPARATUS FOR FREEZING FOODS
Filed Oct. 31, 1940   3 Sheets-Sheet 3

Inventor.
Willard L. Morrison.
by Parker & Carter
Attorneys.

Patented Aug. 29, 1944

2,356,779

UNITED STATES PATENT OFFICE 2,356,779

APPARATUS FOR FREEZING FOODS

Willard L. Morrison, Lake Forest, Ill.

Application October 31, 1940, Serial No. 363,743

38 Claims. (Cl. 62—116)

This invention relates to an apparatus for freezing foods and has for its object to provide a new and improved apparatus of this description.

The invention has as a further object to provide an apparatus for freezing foods to preserve them, particularly adapted for household family use. In the present refrigerators for household family use there is simply provided means for cooling a comparatively small amount of food and the food can only be preserved for a comparatively short space of time, thus necessitating the buying of the food at high retail prices. The present invention has for one of its objects to provide an apparatus by the use of which each individual or family can purchase at one time a large amount of food, so as to secure wholesale prices therefor, and then freeze the various articles of food all in the same device and keep the food in a frozen condition and without becoming dehydrated and in proper condition for use until it is all consumed, even though the time to consume it may take many weeks or months, thus making it possible for the individual or family to buy food at wholesale prices and save large amounts of money thereby. For example, with my apparatus the individual or family can purchase at one time a quarter of a beef, which permits wholesale prices to be secured, and have it cut up into proper steaks, roasts, etc., and then freeze it and use as desired, parts of it until the entire amount is consumed. Chickens, for example, can be bought by the dozen and stored in this device. A family having a large number of children, for example, can buy ice cream by the can and properly preserve it in this device until it is entirely consumed. Fresh vegetables, fruits and berries can be bought in large quantities at wholesale prices and at times when they are cheap, and quickly frozen in this apparatus and used as desired, the frozen articles remaining in a completely frozen condition at all times, this frozen condition not being affected by the opening of the device to remove portions of food therefrom. By means of this apparatus there can always be kept on hand an ample supply of all the necessary kinds of food and unexpected guests easily and satisfactorily taken care of at all times. By the use of this apparatus families can live better at lower costs and at the same time soon pay for the device by the money saved.

The invention has as a further object to provide an apparatus for freezing foods which is within the reach of the small grocers and by means of which losses previously taken on leftover perishables are eliminated and the grocers are able to carry every day of the week, many items which were formerly only carried on Saturday, thus increasing the profits and reducing the losses.

One of the defects of the usual refrigerator is that the articles of food in it are at a higher temperature than the cooling surface or part which cools the space in which the food is located. Under these conditions the moisture in the food is gradually drawn out of the food to the cooling surface. This has two very bad effects. One is that it dries out and spoils the food in a short time and the other is that it requires defrosting of the refrigerator, as this moisture deposits on the cold surface in the form of frost which gradually thickens. One of the objects of my invention is to avoid the dehydrating of the food and the necessity of defrosting the apparatus by surrounding the food receiving space by a sheet or curtain of a direct expansion gas contacting with the cooling wall forming the wall of the cooling space in which the food is received, and providing a cooling wall surrounding the food receiving space at substantially the same temperature as the cooling surface, thus preventing the drawing of the moisture from the food and its deposit upon the cooling wall.

One of the defects with devices of this kind is that the lubricating oil is drawn from the compressor and mixes with the gas and remains in the bottom of the space between the cylinders in which the gas passes, so that the lubricating oil is withdrawn from the compressor and the compressor as it continues running will be injured or stopped due to the lack of lubricating oil. One of the objects of my invention is to provide a separate oil withdrawing device for withdrawing this oil from the space between the cylinders and returning it to the compressor.

The invention has as a further object to provide a cooling device having an evaporator unit construction where there are three metal containers arranged concentrically, the inner two of them having the cooling agent between them and the outer two having insulation between them, the outer metal member surrounding the insulating material and holding the insulating material in place and part of the insulating material supporting the two inner cylinders, the two inner cylinders being free from the outer metal member.

The invention has as a further object to provide a cooling device wherein the low side, or evaporator side, and the high side are so proportioned and arranged that there is such a balanced condition that the cooling space in which the material to be cooled is placed can be held at a temperature substantially equal to that of the refrigerant surrounding the cooling space.

The invention has other objects which are more particularly pointed out in the accompanying description.

Referring now to the drawings.

Like numerals refer to like parts throughout the several figures.

In the construction shown in the drawings the evaporator unit acts as a storage chamber for the frozen food and is surrounded by the insulation and an outer metal cylinder for holding the insulation in place and which forms the exterior of the apparatus. There is an inner cold cylinder 1 of heat conducting material, into which the food or other material to be cooled is placed, and an intermediate cylinder 2 of any desired material, preferably of heat conducting material, the two cylinders spaced apart, the cooling agent passing longitudinally back and forth in the space 3 between them. These cylinders may be formed in any desired manner.

Surrounding the intermediate cylinder is the insulating material 2a, a part of the insulating material 2b being underneath the cylinders 1 and 2. There is an outer metal cylinder 2c which surrounds the insulating material. The metal cylinder 2c holds the insulating material from being displaced and the insulating material holds and centres the inner and intermediate cylinders 1 and 2. The evaporator thus formed constitutes the sole reinforcement for the unit, and the core or central sustaining support for the thin outer cylinder 2c, and the intermediate insulation. The outer metal cylinder 2c has no heat conducting connection with either of the cylinders 1 and 2.

Figures 4, 11:
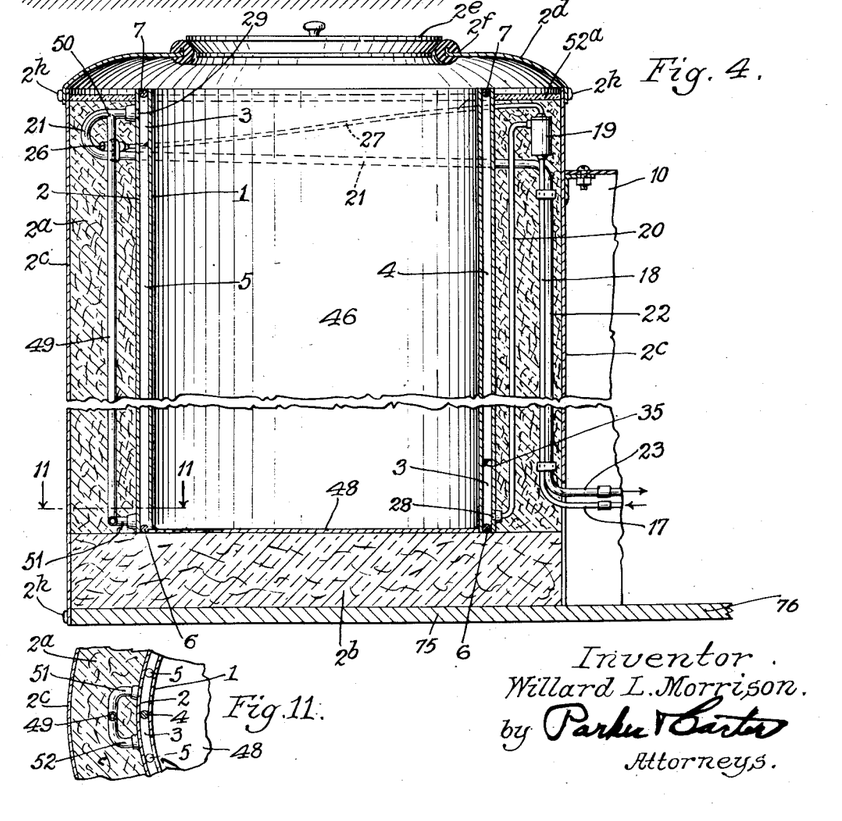
Fig. 4 is a sectional view taken on line 4—4 of Fig. 2.
Fig. 11 is a sectional view taken on line 11—11 of Fig. 4.

Beneath the bottom of the insulation 2b I provide a generally flat base 75, which is shown as having relatively parallel upper and lower generally flat faces. It also includes a lateral extension 76, which may be integral therewith, as shown in Fig. 4. The base thus formed may be mounted on any suitable supports or rollers 77.

There is a top member 2d which preferably engages the outer member 2c and which is connected therewith. This top member is made of metal and has no heat conducting connection with either of the cylinders 1 or 2. It projects up above these cylinders and has a central opening therein which is preferably smaller in diameter than the diameter of the inner cylinder 1. There is a cover 2e for this opening. By having this cover and the inner edge 2f of the top member above the cylinder 1, they are out of the cold area and therefore do not sweat or become frosted. The top member 2d may be connected to the outer member 2c in any desired manner, as, for example, by the fastening devices 2g, which may be covered by a cover member 2h.

Some suitable means is provided for causing a refrigerant material to flow back and forth longitudinally along the cylinders 1 and 2 in the space 3 between them. In the construction shown there are a series of passageway forming members 4 and 5 located in this space and arranged to form a passageway extending back and forth along the cylinders. Any suitable passageway forming members may be used. I prefer to provide cylindrical passageway forming members, which may be rods, tubes, pipes or the like, preferably rods. These rods are preferably of relatively hard or rigid material, so that they will not form a seal when they are compressed against the cylinders.

The cylindrical passageway forming members are preferably provided with bent ends 6 and 7, the bent ends of the alternate passageway forming members being at opposite ends of the cylinders. The ends of alternate passageway forming members do not extend to the ends of the cylinders, so as to leave spaces by means of which the sections of the passageway on opposite sides thereof are connected together so that a continuous passageway is formed. As herein shown, the passageway forming members 4 are short enough to provide the connecting portions 8 of the passageway and the passageway forming members 5 are short enough to provide the connecting portions 9 of the passageway. The members 4 and 5 may be held in position while the parts are being assembled in any desired manner, as by having one or two portions spot-welded, the set 4 being spot-welded to one cylinder and the set 5 being spot-welded to the other cylinder. Any other means for securing this result may be used. The bent end 7 of each member 4 engages, or ends in proximity to, an adjacent member 4, and the bent end 6 of each member 5 engages, or ends in proximity to, an adjacent member 5, as clearly shown in Fig. 3.

The bent ends 6 and 7 of the cylindrical passageway forming members are used to close the upper and lower ends of the space 3 between the two cylinders so as to make a sealed closure which will not permit any of the refrigerant material to escape. This sealed closure is preferably provided by welding the bent ends 6 and 7 to the cylinders 1 and 2 and welding their ends to the adjacent cylindrical passageway forming members, thereby forming a continuous sealing closure which seals the ends of the space 3 between the cylinders. It is of course evident that the ends of this space may be sealed in any other manner desired.

For cooling purposes I have illustrated a refrigerating apparatus preferably enclosed in an enclosing device 10 and which may be of any of the usual constructions and having a motor 11 and a compressor 12 driven by the motor, a condenser 13 and a liquid receiver 14. This enclosing device, and the mechanisms housed therein, may rest upon and extend above the base extension 16. The width of this extension may be less than the diameter of the cylinder, if desired. The motor is shown as having an extension wire terminating in a plug 15 for connecting it to an electric circuit and there is preferably a thermostatic electric back pressure switch 16 in the electrical connection, which is accessible from the exterior of the device, see Figs. 1 and 2. The refrigerant passes from the liquid receiver 14 through the pipe 17 to the pipe 18 which is preferably embedded in the heat insulating material 2a surrounding the cylinders 1 and 2. There is an expansion valve 19, preferably a gas filled valve, also embedded in this heat insulating material which is loosely filled in the space and a pipe 20 leading from the expansion valve to the bottom of the space 3 between the cylinders 1 and 2, so that the refrigerant passes into this space at the bottom. The valve 19 is supported solely by the pipes 18 and 20 and the insulation, see Fig. 4, and is easily accessible when desired, by simply removing the top member 2d and that portion of the insulating material 52a above said valve. A return pipe 21 is connected to the space 3 at the top and has a portion 22 which is preferably embedded in the insulation 2a and a portion 23 which connects with the compressor 12. The refrigerant material passes from the compressor 12 through the pipe 24 to the condenser 13 and thence by the pipe 25 to the liquid receiver 14. The portion 18 of the inlet pipe and the portion 22 of the discharge pipe are preferably placed in proximity to each other, as shown in Fig. 4, so as to provide a heat exchanger arrangement between the two pipes. There is preferably a bulb 26 in proximity to the pipe 21 which is connected by the connecting means 27 with the expansion valve 19 so that the admission of the refrigerant material through the expansion valve is controlled by the temperature of the outflowing refrigerant through the pipe 21. Any of the usual devices for this purpose may be used.

Figure 3:
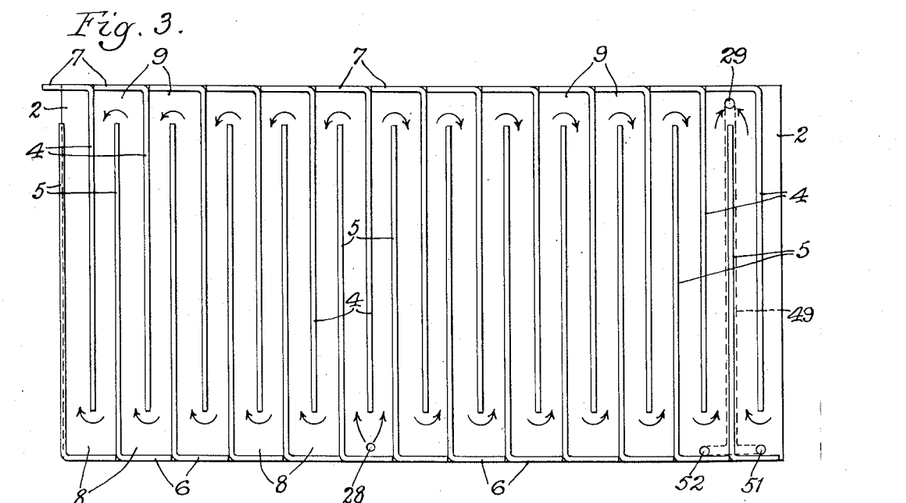
Fig. 3 is a view showing the development of the outer cylinder, with the inner cylinder removed, and the passageway forming members in position.

Instead of having the same refrigerant material pass all the way around the cylinders, I divide the refrigerant material into a plurality of sections or portions, each section or portion passing only part way around the cylinders. There may be as many of these sections or portions as desired. In Fig. 3 I have shown the refrigerant material divided into two sections or portions. This refrigerant material enters at the inlet 28 and there divides, one portion passing in one direction around the cylinders and the other portion in the other direction around the cylinders, the two portions being discharged at the outlet 29 and returned to the source of refrigerant supply through the pipe 21.

Figures 1, 5:
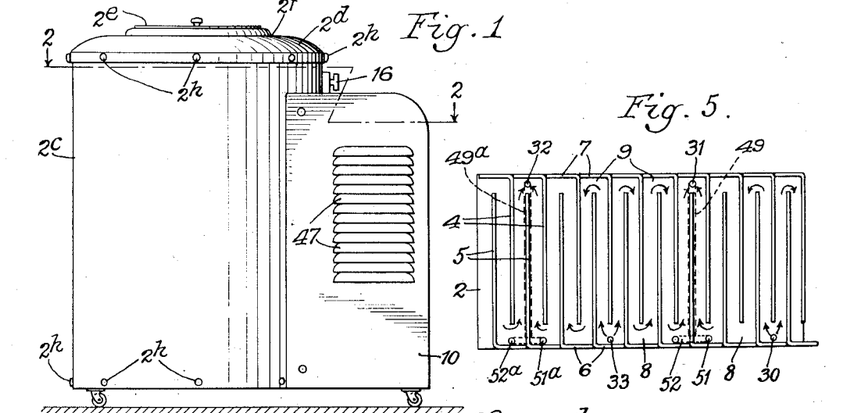
Fig. 1 is an exterior view of one form of device embodying the invention.
Fig. 5 is a view similar to Fig. 3, showing a modified construction.
Figure 2:
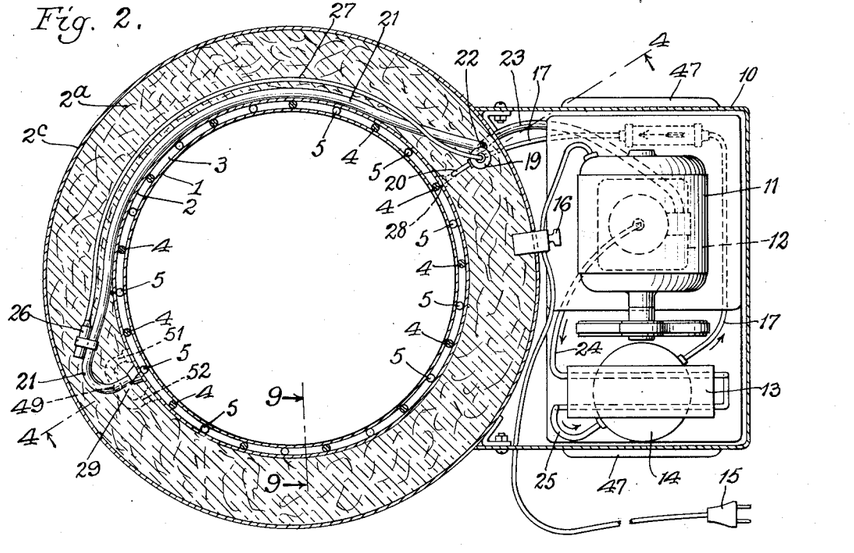
Fig. 2 is an enlarged sectional view taken on line 2—2 of Fig. 1.

In Fig. 5 there is shown a construction where the refrigerant material is divided into four sections or portions. Some of the refrigerant material enters at the inlet 30, one portion or section passing to the right and the other portion or section passing to the left. The portion or section passing to the left passes out of the outlet 31 back to the source of supply. The portion or section passing to the right passes out of the outlet 32 back to the source of supply. Refrigerating material also enters the inlet 33 where it divides into two sections or portions. The section or portion at the right passes out of the outlet 31 back to the source of supply and the section or portion at the left passes out of the outlet 32 back to the source of supply.

This method of admitting and controlling the movement of the refrigerant material through the passageway by dividing the refrigerant material into sections or portions and having each section or portion pass only partway around the cylinders, I have found to be of very great importance. It will be noted that there is here a continuous freely open passageway and that the refrigerant material enters this freely open passageway at a given point or points, for example, and then divides, part going in one direction and another part going in the other direction, each part only going partway around the cylinders. If, for example, after the device has been in operation and the material inside of the inner cylinder 1 has become cooled, some new uncooled material is inserted at one side of the cylinder, more refrigerant will automatically pass around that way instead of the other way, so as to bring the temperature of that portion of the cylinder or evaporator down much more quickly, to much more quickly lower the temperature at that place which has been raised by the warm material being placed on the interior of the cylinder. It will thus be seen that more refrigerant expands on the hot side than on the cold side, thus insuring the quick automatic equalization of the temperature. Since the refrigerant material passes only partway around the cylinders, the pressure drop is less than if the same refrigerant traveled all the way around and there is therefore less obstruction so that the velocity of the refrigerant is not so greatly reduced.

In other words, it will be seen that I have here a continuous passageway extending entirely around the evaporator and that there is admitted refrigerant at one or more points of this passageway, which is free to move in either direction along the passageway responsive to the conditions presented, some going in one direction and some going in the opposite direction, this being one of the very important features of the invention and which very materially increases the efficiency of the apparatus and its proper and successful operation. It will further be seen that the refrigerant material gets out of the evaporator much more quickly and I am enabled to get a lower temperature than if the refrigerant went all the way around the cylinders before it was directed back to the compressor.

It will be observed that substantially the entire face of the inner cylinder 1 is directly subjected to the volatile refrigerant. Thus the refrigerant is separated from the storage space only by the thickness of the cylinder 1, which is of heat-conductive material. I therefore describe the inner surface of the cylinder 1 as a "primary cooling surface."

With an apparatus of this kind, lubricating oil is drawn from the compressor and mixed with the gas and passes through the passageway formed between the cylinders 1 and 2. Due to the large cooling surface of this device and its construction, this lubricating oil, instead of passing back to the compressor, accumulates in the bottom of the space between the cylinders 1 and 2 so that if this is not remedied, substantially all the lubricating oil is withdrawn from the compressor and as the compressor continues to run without sufficient lubricating oil it becomes heated and injured or stops operating altogether. It is necessary to the successful operation of this apparatus that this be remedied. I have provided means for insuring the return of the oil to the compressor so as to insure the continuous successful operation of this apparatus, by having one or more oil suction pipes located outside of the space between the cylinders 1 and 2 and embedded in the insulating material 2a and connected to the bottom of this space and to the pipe running directly to the compressor, so that this oil is drawn up through the oil suction pipe or pipes and returned to the compressor. Any number of these oil suction pipes as required or thought advisable may be used. I have illustrated in Figs. 2 and 4 an oil suction pipe 49 which is connected at the bottom to the pipe 51 which connects to one section of the passageway between the cylinders and to the pipe 52 which connects to the other section of the passageway between the cylinders, the pipe 49 being connected at the other end 50 to the pipe 21 leading back to the compressor, so that the oil deposited at the bottom of the space between the cylinders will be delivered back to the compressor. When the passageway is divided into several sections, for example, as shown in Fig. 5, there are a plurality of the oil suction pipes 49, 49a, etc., the oil suction pipe 49 being connected with the adjacent bottom portions of two passageway sections toward which the two sections of gas are moving, by the pipes 51 and 52. The oil suction pipe 49a is connected to the adjacent bottom portions of two different passageway sections toward which the two sections of gas are moving, by the pipes 51a and 52a.

It is important that the two cylinders 1 and 2 clamp the passageway forming members in between them so as to guide the refrigerant along the continuous passageway formed by these members. This result may be secured in various ways. One way, for example, is to make the cylinders of such size that when the outer cylinder is heated and expanded and placed over the inner cylinder with the passageway forming members in position, this outer cylinder when it cools will contract and clamp the passageway forming members between the two cylinders.

Figures 6, 7, 8, 9, 10:
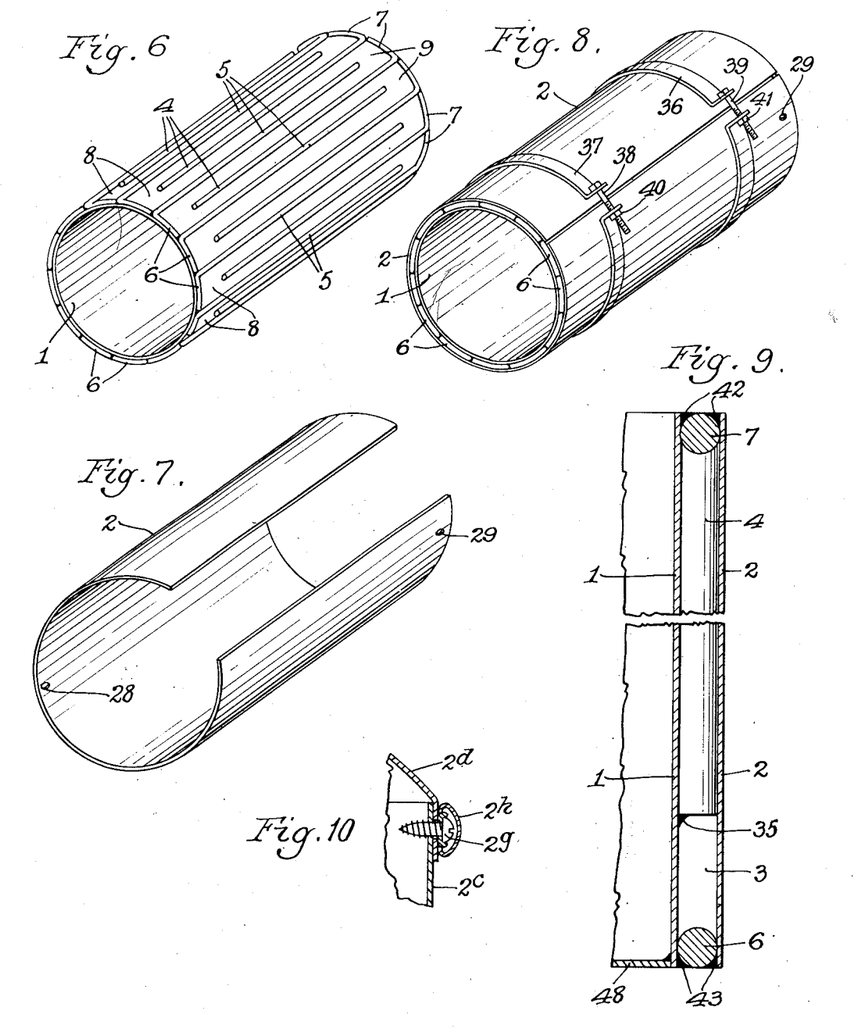
Fig. 6 is a perspective view showing the inner cylinder with the passageway forming members in position.
Fig. 7 is a view showing the outer cylinder before it is placed in position.
Fig. 8 is a view showing the outer cylinder in position, with means for compressing it to tightly clamp the passageway forming members between the two cylinders.
Fig. 9 is an enlarged sectional view, with parts broken away, taken on line 9—9 of Fig. 2.
Fig. 10 is a sectional detailed view showing one method of attaching the top member in position.

There is illustrated in Figs. 6 to 8 another means of securing this result. In this construction the passageway forming members 4 and 5 are placed in position around the inner cylinder 1 and are held in position thereon in any desired manner, as, for example, by being tacked thereto by a small amount of solder, as illustrated, for example, at 35 in Fig. 9. This small amount of solder is used to connect each of the passageway forming members to the inner cylinder 1. The outer cylinder 2 is split and is then folded around the inner cylinder and compressed around the inner cylinder and the passageway forming members 4 and 5. This compression may be secured by means of the adjustable bands 36 and 37 placed about the outer cylinder and having the threaded bolts 38 and 39 passing through the ends of the bands, the bolts being provided with nuts 40 and 41 which are tightened up to cause the outer cylinder to clamp the passageway forming members in between the two cylinders. This brings the edges of the outer cylinder in proximity to each other and these edges are then welded together to form a sealed connection. The bands 36 and 37 are then removed. In Fig. 9 I have illustrated the method of closing up the ends of the space 3 between the two cylinders 1 and 2 by means of the welds 42, 43.

The material to be cooled is placed in the receptacle 46 formed by the cylinder 1. The enclosing device 10 for the refrigerating apparatus comprising the compressor 12 and associated parts is provided with ventilating devices, such as the louvers 47.

The cooling receptacle for the material to be cooled is provided with a bottom 48. When the two edges of the outer cylinder 2 are brought together to clamp the passageway forming members and the edges are welded together, there is a further clamping of the passageway forming members, produced by the contraction due to the cooling after welding. The switch 16 is preferably a thermostatically controlled cycling switch that automatically controls the electric motor.

By means of this device I am enabled to freeze the food in the chamber 46 to various degrees of hardness, from comparatively soft to extremely hard, and maintain it in a frozen condition as long as the motor and compressor operate properly.

While the passageway forming members 4 and 5 are clamped between the cylinders 1 and 2 so as to insure the refrigerant being guided back and forth along the continuous passageway formed thereby, the clamping is preferably such that a small amount of the refrigerant can leak past them so that the inner cylinder 1 becomes in fact a complete primary cooling surface.

It will further be seen that there is here provided a separate oil pipe 49 connected in the refrigerating system in multiple with the passageway extending longitudinally along the cylinders 1 and 2 in the space 3 between them.

There is preferably a circular strip of insulating material 52a between the outer cylinder 2c and the intermediate cylinder 2 and at the ends thereof, as clearly shown in Fig. 4.

I claim:

1. A device for freezing foods comprising an evaporator comprising two cylinders of different diameters, one within the other, the inner cylinder forming a food receiving receptacle, said cylinders having a space between them, provided with a series of sections forming a continuous passageway extending back and forth longitudinally in the space between said cylinders along which a gaseous refrigerant is passed, a refrigerating apparatus connected with said passageway, comprising a compressor, and means separate from said passageway for removing oil from the compressor that may be deposited in said passageway, and returning it to the compressor.

2. A device for freezing foods comprising two cylinders of different diameters, one within the other, the inner cylinder forming a food receiving receptacle, said cylinders having a space between them, provided with a series of sections forming a continuous passageway extending back and forth longitudinally in the space between said cylinders, a refrigerating system connected with said passageway, comprising a compressor, and a separate oil pipe connected in said system in multiple with said passageway between said cylinders, for returning to the compressor oil that may be deposited in said passageway.

3. A device for freezing foods comprising two cylinders of different diameters, one within the other, the inner cylinder forming the food receiving receptacle, said cylinders having a space between them, a plurality of separate passageway forming members in said space between said cylinders and shorter than said cylinders, every other of said passageway forming members having one end adjacent to the same ends of said cylinders, each of the remaining passageway forming members having one end adjacent to the opposite ends of said cylinders, sealing means for sealing both of the ends of the space between said cylinders, the passageway forming members cooperating with the cylinders to provide a continuous passageway extending back and forth longitudinally along said cylinders, through which a portion of volatile refrigerant material is passed, said passageway forming members having leak spaces between them and the outer wall of the inner cylinder through which portions of the gaseous refrigerant pass, so as to make contact with the inner cylinder opposite said passageway forming members.

4. A device for freezing foods comprising two cylinders of different diameters, one within the other, the inner cylinder forming the food receiving receptacle, said cylinders having a space between them, a plurality of passageway forming members in said space between said cylinders and shorter than said cylinders, every other of said passageway forming members having one end adjacent to the same ends of said cylinders, the intermediate passageway forming members having one end adjacent to the opposite ends of said cylinders and sealing means for sealing both of the ends of the space between said cylinders, the passageway forming members, in conjunction with said cylinders, providing a continuous passageway extending back and forth longitudinally along said cylinders, through which refrigerant material is passed, the said passageway forming members being loose enough to permit some of the refrigerant material to leak past them so that substantially the entire cooling surface of the inner cylinder is a primary cooling surface.

5. A device for freezing foods comprising an inner central cylinder of heat conducting material into which the material to be cooled is placed, closed at the bottom and open at the top, an outer cylinder surrounding the inner central cylinder, an intermediate cylinder surrounding the central cylinder, the three cylinders being separated by cylindrical spaces, means for passing a refrigerant through the space between the inner cylinder and the intermediate cylinder, to cool the inner cylinder, a cylinder of insulating material between the outer cylinder and the intermediate cylinder, and a metal top connected with the outer cylinder and projecting above and overlying said intermediate and inner cylinders and out of contact therewith and above the highest portion of the inner cylinder and out of contact with said inner and intermediate cylinders and the cooled air in the inner cylinder, whereby frosting of the metal top is prevented.

6. A device for freezing foods comprising an inner central cylinder of heat conducting material into which the material to be cooled is placed, closed at the bottom and open at the top, an outer cylinder surrounding the inner central cylinder, an intermediate cylinder surrounding the central cylinder, the three cylinders being separated by cylindrical spaces, insulating material between the outer cylinder and the intermediate cylinder, a refrigerating apparatus having a pipe leading to the space between said cylinders, said pipe having two sections located between the outer cylinder and the intermediate cylinder, and an expansion valve connecting the two sections together and supported by said sections and means for securing access to the said expansion valve.

7. A device for refrigerating and storing materials comprising two cylinders of different diameters, one within the other, the inner cylinder being closed at the bottom and acting as a cooling receptacle for the material to be stored, and defining the storage space for such material, a series of baffles extending between the two cylinders and forming with the two cylinders a continuous passageway through which a volatile refrigerant may be passed, the baffles being constructed and arranged to provide sufficient clearance to permit the passage of refrigerant past the baffles and across the outer face of the inner cylinder, said passage being continuous throughout the entire circumference of the evaporator and diametrically opposed inlet and outlet connections with said passageway through which a refrigerant may be passed into and removed from said continuous passageway.

8. A self-supporting evaporator and storage unit comprising an inner cylinder, an intermediate cylinder and an outer cylinder, said inner and intermediate cylinders being sealed together at their ends, a bottom element closing the bottom of said inner cylinder, a plurality of baffles located in the space between said inner and intermediate cylinders and defining with the cylinders a tortuous passage, there being a clearance about said baffles sufficient to permit leakage between runs of said passage, a layer of insulating material between the intermediate and outer cylinders, and means for circulating a volatile refrigerant through the tortuous passage thus formed, including inlet and outlet ducts embedded in the insulating material, and of substantially greater length than the radial distance between the outer and the intermediate cylinders, and being adapted by their form to permit ready flexure in the event of movement of the outer cylinder in relation to the inner and intermediate cylinders.

9. An evaporator element comprising an inner cylinder having a closed end and an open end, an outer cylinder surrounding the inner cylinder, the cylinders being sealed together adjacent their ends, longitudinally extending partition elements of generally circular exterior cross section, located in the space between said cylinders, and forming walls of a continuous tortuous passage in the space between said cylinders, said inner cylinder forming a wall of said passage, the fit between said elements and said cylinders being sufficiently loose to permit refrigerant leakage across the elements separating adjacent runs of said passage and across the outer surface of the inner cylinder, and inlet and outlet ducts for said evaporator unit in communication with said tortuous passage.

10. A refrigeration and storage unit comprising a relatively flat base having a generally circular part and a lateral projection therefrom, a generally cylindrical evaporator unit mounted on said circular part and having an inner wall defining the storage space of said unit and a closed bottom, a surrounding body of insulation supported about the evaporator, the evaporator constituting the sole reenforcement of the unit, an outer shell surrounding said insulation, and conforming generally to the contour of said base, and means for circulating a refrigerant through the evaporator including a compressor and a condenser mounted on the lateral projection of said base, and a housing therefor abutting against the side of said outer shell.

11. In a refrigeration apparatus, refrigerant liquifying means and an evaporator in series therewith, said evaporator comprising two shells, one surrounding the other, and having a tortuous passage therebetween, made up of a series of generally parallel runs, with spaces through the wall surfaces separating adjacent runs, adequate to provide a leakage from one run to another, the inner face of the inner shell defining a storage space open at the top, a bottom closure for said space and means for insulating said space from above, including a cover extending above and having all portions spaced upwardly from the top of the cooling portion of the evaporator and out of contact with the cold air within the evaporator, and cooperating with the evaporator to maintain a body of still air above the cold air in said evaporator.

12. An evaporator for refrigerating devices, comprising two cylinders of different diameters, one within the other, the inner cylinder acting as a cooling receptacle for the material to be frozen, a series of longitudinally extending rods, having portions frictionally gripped between the two cylinders, some of the rods terminating short of one end of the cylinders and some short of the other end, and defining with the cylinders a continuous tortuous passageway, the two cylinders being sealed together at their ends, the clearance between the rods and the cylinders being sufficiently free to permit leakage of a refrigerant between adjacent runs of the tortuous passageway, and inlet and outlet ducts for said evaporator in communication with said tortuous passageway.

13. A refrigerating device comprising an inner generally cylindrical evaporator formed of two concentric radially spaced cylinders having baffles therebetween, the inner cylinder having an inner surface surrounding a storage space, a bottom closure for said storage space, a cylindrical mass of insulating material surrounding the exterior of said evaporator, a shell of substantially less thickness than the radial thickness of the evaporator surrounding and confining the insulating material, and a base upon which the unit thus formed is superposed, the evaporator constituting the sole reenforcement for said unit, a layer of insulating material between the closed bottom of the evaporator and the base and a removable cover for the top of the space surrounded by the evaporator.

14. An evaporator unit construction comprising two cylinders of different diameters, one within the other, said cylinders having a space between them, a plurality of cylindrical passageway forming members in said space between said cylinders, said cylindrical passageway forming members being divided into two sets, one set having bent ends which extend along the upper edges of said cylinders and the other set having bent ends which extend along the lower edges of said cylinders, and means for utilizing said bent ends to form sealed closures for the upper and lower ends of the space between said cylinders.

15. An evaporator unit comprising two metal cylinders of different diameters, one within the other and radially spaced apart and circumferentially sealed together adjacent their ends, and means for dividing the space between the cylinders into a tortuous path including a plurality of relatively rigid metal partition members longitudinally extending through the space between the cylinders, the outer cylinder being tensioned around the partition members, and holding them in compression against the inner cylinder.

16. The structure of claim 15, in which one of said cylinders has a closed end and an open end, the other cylinder being open at each end.

17. An evaporator unit comprising two metal cylinders of different diameters, one within the other, and radially spaced apart and circumferentially sealed together adjacent their ends, and means for providing a tortuous passage therebetween including a plurality of longitudinally extending circumferentially spaced rods of relatively rigid metal, the outer cylinder being tensioned around the rods and holding them in compression against the inner cylinder, there being two sets of rods, those of one set alternating with those of the other, the rods of one set extending to points close to one end of the evaporator unit, and those of the other set extending to points close to the other end of the evaporator unit, each rod stopping sufficiently short of the end of the unit opposite the end to which it most closely approaches, to provide a passage gap.

18. An evaporator unit comprising two metal cylinders of different diameter, one within the other, and radially spaced apart and circumferentially sealed together adjacent their ends, and means for providing a tortuous passage therebetween including wall elements of substantially rigid metal, separating the space between the cylinders into a plurality of generally parallel runs, the outer cylinder being tensioned around the inner cylinder sufficiently to maintain said wall elements in passage completing position while permitting leakage of the refrigerant between runs.

19. An evaporator unit construction comprising two members of different diameters, one within the other, the inner member formed of heat conducting material, said members having a space between them open at the ends, a series of separate pieces in said space dividing said space into a series of passageways connected together to form a continuous conduit for refrigerant material, the alternate separate pieces having laterally projecting parts at one end which close one end of the space between the two members of different diameters, the other alternate pieces having laterally projecting parts at their opposite ends which close the other end of the space between the two members of different diameters, and a sealing connection between said laterally projecting parts and the two cylinders.

20. In a refrigeration apparatus, refrigerant liquifying means and an evaporator in series therewith, said evaporator comprising two cylinders of generally circular cross section, one surrounding and sealed adjacent its ends to the other, said cylinders being spaced apart and having a tortuous passage therebetween made up of a series of runs extending generally parallel to the axis of said evaporator, said evaporator being so constructed that leakage occurs between adjacent runs and the normal travel of the refrigerant through said passage and said leakage wipe sufficient surface of the inner cylinder with refrigerant to maintain such cylinder at a substantially uniform temperature throughout.

21. The structure of claim 20 characterized by and including a bottom closure for the space within the inner cylinder adapted, with said inner cylinder, to define a storage space open at the top.

22. A device for refrigerating and storing materials comprising two cylinders of different diameters, one within the other, the inner cylinder being closed at the bottom and acting as a cooling receptacle for the material to be stored, and defining the storage space for such material, a series of baffles extending between the two cylinders and forming with the two cylinders a continuous passageway through which a volatile refrigerant may be passed, the baffles being constructed and arranged to provide sufficient clearance between them and the opposed cylinder to permit the passage of refrigerant past the baffles and across the outer face of the inner cylinder, and inlet and outlet connections with said passageway through which a refrigerant may be passed into and removed from said continuous passageway.

23. In a refrigeration apparatus, refrigerant liquifying means and an evaporator in series therewith, the evaporator comprising an inner and an outer member spaced apart and defining therebetween a space through which the refrigerant flows, means for extending the path of the refrigerant through the evaporator, and for so directing and distributing refrigerant in liquid form against substantially the entire outer surface of the inner member as to cause substantially even distribution of evaporation, the inner surface of the inner member surrounding and circumferentially defining the storage space of the apparatus, the effective area of the inner surface of the inner member being sufficiently great, in relation to the surrounded space, to maintain substantial equality between the temperature of the refrigerant as it flows through the evaporator and the temperature of the space defined by the evaporator.

24. In a refrigeration apparatus, refrigerant liquifying means and an evaporator in series therewith, said evaporator comprising two cylinders, one surrounding the other and outwardly spaced therefrom, the cylinders having a tortuous passage therebetween made up of a series of generally parallel runs, said evaporator being so constructed that leakage occurs between adjacent runs, and the normal travel of the refrigerant through said passage, and said leakage, wipe sufficient surface of the inner element with refrigerant to maintain such element at a substantially uniform temperature throughout, the effective area of the inner surface of the inner cylinder being sufficiently great, in relation to the surrounded space, to maintain substantial equality between the temperature of the refrigerant as it flows through the evaporator, and the temperature of the space defined by the evaporator.

25. The structure of claim 23 characterized by said inner and outer members being generally cylindrical and concentrically arranged about a generally vertical axis.

26. The structure of claim 23 characterized by the facts that said inner and outer members are generally cylindrical and concentrically arranged about a vertical axis, and that an outer cylinder is generally concentric with and spaced outwardly from the evaporator, and insulating material fills the space between said outer cylinder and the evaporator and extends beneath the evaporator.

27. The structure of claim 23 characterized by and including a removable closure located above and generally vertically aligned with the storage space of the apparatus, said closure being located entirely above the effective cooling portion of said evaporator.

28. The combination of a cooling unit structure including a cabinet, a housing connected to said cabinet, and refrigerant liquifying means, enclosed by the housing, said cooling unit structure including an evaporator comprising an inner cylinder closed at the bottom, and surrounding a storage space, an intermediate cylinder surrounding said inner cylinder and forming therewith an evaporator chamber connected to said refrigerant liquifying means, heat insulating material surrounding and extending beneath said evaporator to form a support therefor, and an outer cylinder surrounding said insulation and forming the exterior vertical wall of the cabinet, said evaporator forming the skeleton around which the rest of said cabinet is built.

29. The structure of claim 28 characterized by and including a removable closure element located entirely above and generally vertically aligned with said storage space and out of heat conducting relationship with said evaporator.

30. In combination, in a refrigeration apparatus, a cabinet, a machinery housing connected to said cabinet, refrigerant liquifying means in said housing, an evaporator in said cabinet, comprising an inner cylinder closed at the bottom and open at the top and circumferentially defining a storage space, and an intermediate cylinder surrounding said inner cylinder and sealed thereto at top and bottom, and forming therewith an evaporator chamber connected to said refrigerant liquifying means, insulating material surrounding said evaporator structure and extending beneath it, and forming a support therefor, and an outer cylinder surrounding said insulating material and forming the exterior vertical wall of the cabinet, said evaporator forming the skeleton of said cabinet about which the rest of the cabinet is built, and removable means for closing said storage space from above.

31. A refrigerating apparatus comprising two cylinders open at the top, one within the other, the two separated by a cylindrical space, a series of passageway forming members in the space between said cylinders, the ends of some of said passageway forming members projecting beyond the ends of other of said passageway forming members so as to form in cooperation with the two cylinders a continuous back and forth passageway, an inlet and an outlet for said passageway, a compressor, a connection between said compressor and said inlet for delivering refrigerant thereto, a connection from said outlet to said compressor for returning refrigerant from said passageway to said compressor and means for removing oil from said passageway and returning it to said compressor.

32. A refrigerating apparatus comprising a compressor, two cylinders open at the top, one within the other, the two separated by a cylindrical space, a series of passageway forming members in the space between said cylinders, the ends of some of said passageway forming members projecting beyond the ends of other of said passageway forming members so as to form in cooperation with the two cylinders, a continuous back and forth passageway, said passageway forming members in cooperation with the two cylinders forming a continuous passageway, an inlet at one end of said passageway and an outlet at the other end of said passageway, a connection between said compressor and said inlet for delivering refrigerant thereto, a connection from said outlet to said compressor for returning refrigerant from said passageway to said compressor and means for removing oil from said passageway and returning it to said compressor, said means comprising a pipe connecting with said passageway near the bottom of said cylinders and connected with the pipe through which refrigerant is returned to the compressor.

33. A refrigerating apparatus comprising a cooling unit comprising two cylinders open at the top, one within the other with a space between them, an insulating cylinder surrounding said cylinders, a passageway for the refrigerant extending back and forth in said space longitudinally of said two cylinders, the interior of the inner of the two cylinders forming the cooling space for the material to be cooled, a compressor, a condenser, a connection from the upper part of said passageway to said compressor, a pipe connected at its lower end with the lower part of said passageway and at its upper end with the connection leading from the upper part of said passageway to the compressor, said pipe being located outside of said two cylinders and extending through the insulating cylinder, by means of which oil is removed from the space between the two cylinders and returned to the compressor.

34. A refrigerating apparatus comprising a cooling unit comprising two cylinders, open at the top, one within the other with a space between them, a passageway for the refrigerant extending longitudinally back and forth in said space, the interior of the inner cylinder forming the cooling space, an insulating cylinder surrounding said two cylinders, a base for said cylinders having a part which projects laterally from the cylinders, a refrigerant supplying unit at one side of said cylinders and mounted on the laterally extending portion of the base, side enclosing members for said refrigerant supplying unit connected with said outer cylinder and separated at a distance shorter than the diameter of the outer cylinder, leaving the greater part of the outer cylinder free, so that access may be had to the cooling space around the greater part of th outer cylinder.

35. A self-supporting evaporator and storage unit comprising an inner cylinder, an intermediate cylinder and an outer cylinder, said inner and intermediate cylinders being sealed together at their ends, a bottom element closing the bottom of said inner cylinder, supporting means for spacing said intermediate cylinder outwardly away from said inner cylinder, a layer of insulating material between the intermediate and outer cylinders, and means for circulating a volatile refrigerant through the tortuous passage thus formed, including inlet and outlet ducts embedded in the insulating material, and of substantially greater length than the radial distance between the outer and the intermediate cylinders, and being adapted by their form to permit ready flexure in the event of movement of the outer cylinder in relation to the inner and intermediate cylinders.

36. A device for freezing foods comprising an inner central cylinder of heat conducting material into which the material to be cooled is placed, closed at the bottom and open at the top, an outer cylinder surrounding the inner central cylinder, an intermediate cylinder surrounding the central cylinder, the three cylinders being separated by cylindrical spaces, means for passing a refrigerant through the space between the inner cylinder and the intermediate cylinder, to cool the inner cylinder, a cylinder of insulating material between the outer cylinder and the intermediate cylinder, and a top connected with the outer cylinder and projecting above and overlying said intermediate and inner cylinders and out of contact therewith and above the highest portion of the inner cylinder and out of contact with said inner and intermediate cylinders and the cooled air in the inner cylinders, whereby frosting of the top is prevented.

37. A refrigerating device comprising an inner generally cylindrical evaporator formed of two concentric radially spaced cylinders having baffles therebetween, the inner cylinder having an inner surface surrounding a storage space, a bottom closure for said storage space, a cylindrical mass of insulating material surrounding the exterior of said evaporator, a shell surrounding and confining the insulating material, and a base upon which the unit thus formed is superposed, the evaporator constituting the sole reinforcement for said unit, a layer of insulating material between the closed bottom of the evaporator and the base and a removable cover for the top of the space surrounded by the evaporator.

38. The combination of a cooling unit structure including a cabinet and refrigerant liquifying means, said cooling unit structure including an evaporator comprising an inner cylinder closed at the bottom, and surrounding a storage space, an intermediate cylinder surrounding said inner cylinder and forming therewith an evaporator chamber connected to said refrigerant liquifying means, heat insulating material surrounding and extending beneath said evaporator to form a support therefor, and an outer cylinder surrounding said insulation and forming the exterior vertical wall of the cabinet, said evaporator forming the skeleton around which the rest of said cabinet is built.

WILLARD L. MORRISON.